Jan. 28, 1969   N. CHERUP   3,424,495
SEAT BELT CONSTRUCTION
Filed April 11, 1966

INVENTOR.
NICHOLAS CHERUP
BY Hauke, Kress & Gifford

United States Patent Office 3,424,495
Patented Jan. 28, 1969

3,424,495
SEAT BELT CONSTRUCTION
Nicholas Cherup, 24215 Hill St., Warren, Mich. 48091
Filed Apr. 11, 1966, Ser. No. 541,649
U.S. Cl. 297—386                              4 Claims
Int. Cl. A62b 35/00

ABSTRACT OF THE DISCLOSURE

A seat belt for automobiles and the like in which the strap portion is constructed of an elasticized woven fabric containing both elastomeric and nonelastomeric threads or cords and characterized by a convex stress-strain curve over at least a portion thereof.

---

The present invention relates to seat belts for automobiles and the like and more particularly to an improved construction for such seat belts in which the strap portion thereof is constructed of an elasticized woven fabric.

Heretofore the strap portion of seat belts for automobiles and the like have generally been formed from inelastic material such as nylon or the like. So far as I am aware it has never been suggested that such straps be formed of elastic material probably for the reason that with ordinary elastomeric materials having substantially linear stress-strain curves, such seat belts would have the tendency to stretch too much at relatively low force load to insure that the wearer would be safe from injury.

My previous Patents Nos. 2,934,766 and 3,089,144 disclose and claim impact absorbers in the form of rigid protective members adapted to be placed over the portion of the person's body to be protected and a membrane formed of elasticized woven fabric carried by the protective member for the purpose of absorbing any impacts applied to the protective member and distributing the residual force of such impacts at a low unit pressure to the object to be protected. The main advantages of these impact absorbers resulted from the use of elasticized, tightly woven fabrics for the membrane and the fact that such fabrics have a highly convex stress-strain curve up to roughly half their maximum stretch. This provided a construction producing a maximum absorption of impact without excessive stretch.

The present application discloses the use of such materials for the strap portion of seat belts. Use of such material in the place of nonelastic materials such as nylon or the like provides a seat belt in which a large portion of the impact ordinarily absorbed through the belt by the wearer upon a sudden stop or collision will be absorbed by the belt and only the residual force will be transmitted to the wearer at a relatively low unit pressure.

The present application is not to be limited to seat belts per se but is intended to be directed also to shoulder harness safety straps which are finding increasing use as automotive type safety devices. Thus wherever the term seat belt is used in this application it is also intended to mean this type of safety strap also. Such devices are intended to aid in the prevention of wiplash type injuries and when elasticized woven fabrics are used in the straps of such devices, the impact absorption produced thereby tends to cushion the forward movement of the wearer upon sudden impact and thereby greatly aid in the reduction of these types of injuries.

Heretofore it has been felt that seat belts constructed of an elastic material would not be feasible. This is because with ordinary elastic materials such seat belts would not absorb enough impact energy to prevent injury. The tendency of the belt to stretch at low force loads would permit the wearer to be hurled into the steering wheel, dashboard, etc., upon the automobile coming to a sudden stop or upon collision.

The reason for this is largely the substantially linear stress-strain curve of ordinary elastic materials. If the closest distance between the wearer and the closest obstruction of the automobile, such as the steering wheel 20 in FIG. 1, is $X_0$ and the maximum force in the seal belt which can be sustained without permitting the wearer to come into injury producing contact with the steering wheel 20 is $F_0$, then optimum conditions would require that these be attained simultaneously in order to maximize the amount of energy absorbed by the seat belt without injury to the wearer. As shown in FIG. 3, if the stress-strain curve is linear, then the maximum energy which can be absorbed is represented by the line $a$ and the shaded area beneath line $a$. A "steeper" line (shown as $b$) will obviously absorb less energy, and so will a "flatter" line (shown as $c$), because the areas beneath them will be smaller. The maximum energy which can be absorbed by seat belt straps having a linear stress-strain curve is thus $$F_0 X_0 / 2$$

if the design is perfect (that is to say if the slope of the force-distance curve is equal to $F_0/X_0$). If the energy produced upon impact exceeds this value, the wearer will be hurled against the steering wheel or other obstruction and probably be injured.

The present invention provides a seat belt in whilch a greater impact absorption is produced by reason of the utilization of elasticized woven fabrics for the straps of the seat belts with the fabric containing both elastomeric and nonelastomeric threads and constructed to produce a highly convex stress-strain curve over at least the initial portion thereof.

It is an object then of the present invention to improve seat belts for automobiles and the like by constructing the straps of such belts of an elasticized woven fabric.

It is another object of the present invention to make the straps of automotive type seat belts impact-absorbant by forming such straps of an elasticized woven fabric of the type characterized by having a convex-concave tensile force elongation curve.

It is another object of the present invention to improve automotive type seat belts constructed of such elasticized woven fabric straps by constructing same so that substantially only the convex portion of the tensile force elongation curve is effective at elongations up to that causing the wearer to come into contact with the closest obstruction provided by the automobile.

Still further objects and advantages of the present invention will readily occur to one skilled in the art to which the invention pertains upon reference to the following description. The description makes reference to the following drawings which refer to like parts throughout the several views and in which.

Figure 5:
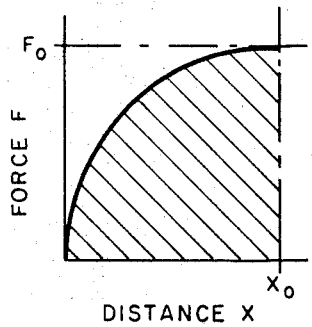
Figure 3:
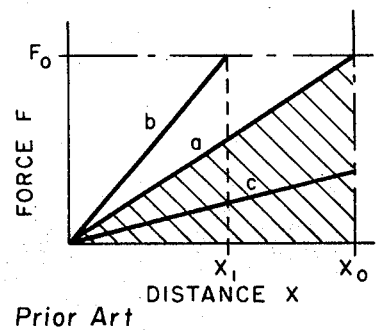
Figure 4:
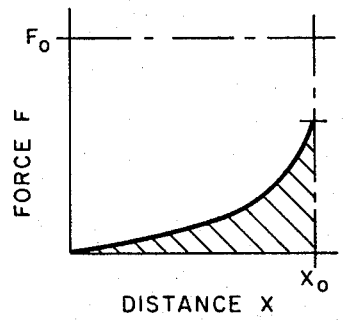
Figure 6:
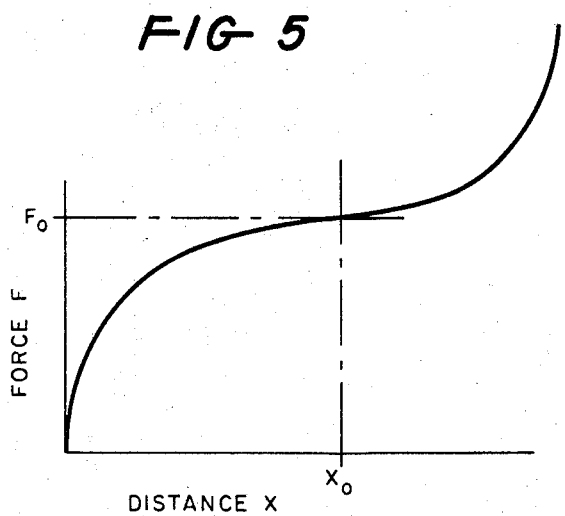

FIG. 3 shows diagrammatically various force-distance curves for conventional elastic, i.e., linear materials, FIG. 4 shows diagrammatically a force-distance curve of the type resulting when conventional elasticized woven fabrics are employed for the straps of a seat belt, and FIGS. 5 and 6 show diagrammatically force-distance curves of the type resulting when a special tightly-woven elasticized fabric is employed for the straps of the seat belt according to the present invention.

Figure 1:
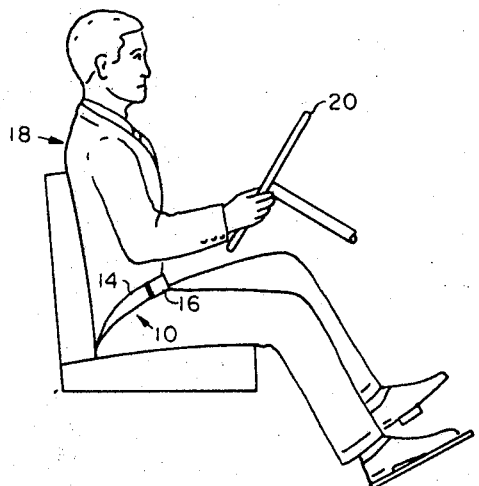
FIG. 1 is a general view of a preferred embodiment of the present invention illustrating a seat belt in use in an automobile.
Figure 2:
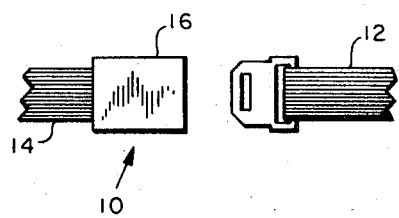
FIG. 2 is a fragmentary elevational view of a seat belt constructed in accordance with the present invention.

Now referring to the drawings for a more detailed description of the present invention, FIGS. 1 and 2 illustrate a preferred embodiment thereof as comprising a seat belt generally indicated at 10 and including a pair of straps 12 and 14 one of which carries a conventional buckle 16 for tightening the seat belt 10 about the middle of a wearer 18 in the conventional manner. In FIG. 1, the seat belt 10 is shown on the driver side of the automobile so that the wearer 18 is grasping a steering wheel 20. It is apparent that in such a situation the greatest danger to the wearer will probably be that upon impact he might be hurled against the steering wheel 20 with a sufficient force to produce injury. If the seat belt 10 is positioned on the passenger side of the automobile, then such danger would be the danger of being hurled into the dashboard (not shown) or into the windshield (not shown).

In any even it has been found that injuries can result even when seat belts are used because of the failure of ordinary nonelastic belts to absorb very much of the energy produced upon the automobile suddenly stopping or being caused to suddenly stop as by collision. With such seat belts the impact may be so great that the failure of the belt to absorb any appreciable portion of the energy produced by forward movement of the wearer may cause serious injury to the midsection of the wearer.

In the present invention, it is preferred that the straps 12 and 14 of the seat belt 10 be each constructed of an elasticized woven fabric containing both elastomeric and non-elastomeric threads or cords. It is also contemplated that the material for the straps 12 and 14 will comprise a special type of elasticized woven fabric, characterized by a convex stress-strain curve. While this is the preferred construction, it is to be understood that if desired only one of the straps could be constructed of such material or a portion only of one or both straps could be constructed of such materials and the result would be the same.

The mechanical behavior of an ordinary elasticized woven fabric is shown in FIG. 4. At relatively low loads such material behaves very much as if it consisted of rubber alone, having an approximately linear stress-strain curve of low slope (i.e., high extensibility). After the rubber has been stretched somewhat, the stress-strain curve becomes highly concave in shape apparently because of the fact that the non-rubber threads interfere with the further stretching of the rubber threads. The result is very unsatisfactory insofar as absorption of energy is concerned as seen by the smallness of the shaded area in FIG. 4. This behavior accounts for the fact that elasticized woven fabrics are not used in seat belts in place of the ordinary nonelastic fabrics.

However, I have found as disclosed in my aforementioned patents that it is possible to obtain tightly woven elasticized fabrics having highly convex stress-strain curves, such as shown in FIG. 5. That is to say, they have highly convex stress-strain curves up to roughly half their maximum possible stretch. Beyond that point they become concave, like ordinary elasticized woven fabrics; that is to say, the stress-strain curve is like that shown in FIG. 6.

As pointed out in my previous patents, although the stress-strain curves of elasticized woven fabrics are not linear the stretch is nevertheless reversible. There may be a small hysteresis loop on reversal, but there is no perceptible permanent stretch. The combination of this reversibility of stretch and the convex stress-strain curve characteristic of tightly-woven elasticized fabrics makes them the ideal material for use as energy absorbers, particularly in seat belts, where it is crucial to have maximum absorption of energy without excess stretch.

A type of material suitable for use in the straps of the seat belts of the present invention was obtained from Elastic Corp. of Easthampton, Mass. It is described by them as 1–336 3″ white with natural back woven elastic of cotton and nylon, containing warp yarn of cotton, filling of nylon and natural rubber strands. The characteristics of such material are more clearly set forth in my aforementioned Patent No. 3,089,144.

A seat belt constructed of such material provides an extremely effective energy absorber provided the design is such that substantially only the convex portion of the curve is effective in use up to the time when the wearer of the belt comes into contact with the nearest forward obstruction afforded by the automobile.

It is apparent that although the description has been directed to a seat belt construction, such material could be used as well in shoulder type harnesses for automotive installations. Such shoulder harnesses have been found to aid in the prevention of whiplash type injuries often incurred in automobile collisions. Such injuries are the result of the upper portion of the body being suddenly thrown in alternate forward and rearward directions. With a shoulder harness constructed of the aforesaid material, there is a cushioning effect produced during forward motion of the body which reduces those forces tending to produce whiplash.

Having now described my invention fully, I claim:

1. A safety strap construction for automobiles and the like comprising a pair of straps and a buckle, at least a portion of the length of one of said straps being constructed of a tightly woven elasticized fabric comprising interwoven substantially inelastic fibers and substantially reversibly stretchable fibers and characterized by having a convex-concave tensile force elongation curve.

2. The safety strap as defined in claim 1 and in which said automobile is provided with an obstruction spaced a predetermined distance forwardly of the wearer of said seat belt and substantially only the convex portion of said force elongation curve of said fabric being effective at elongations up to that causing contact between said wearer and said obstruction.

3. The safety strap as defined in claim 1 and in which each of said straps are constructed entirely of said fabric.

4. The safety strap as defined in claim 3 and in which said automobile is provided with an obstruction spaced a predetermined distance forwardly of the wearer of said seat belt and substantially only the convex portion of said force elongation curve of said fabric being effective at elongations up to that causing contact between said wearer and said obstruction.

References Cited

UNITED STATES PATENTS

| | | | |
|---|---|---|---|
| 2,639,852 | 5/1953 | Sanders et al. | 297—386 |
| 3,074,760 | 1/1963 | Hodgekin | 297—386 |
| 3,132,898 | 5/1964 | Kittelson | 297—386 |
| 3,134,626 | 5/1964 | Von Ardenne et al. | 297—386 |
| 3,232,383 | 2/1966 | Moberg | 297—386 |
| 3,302,973 | 2/1967 | Ravau | 297—386 |

JAMES T. McCALL, *Primary Examiner.*

U.S. Cl. X.R.

297—385